(12) United States Patent
Klatsmanyi et al.

(10) Patent No.: US 7,589,616 B2
(45) Date of Patent: Sep. 15, 2009

(54) MOBILE DEVICES INCLUDING RFID TAG READERS

(75) Inventors: Nandor Klatsmanyi, Berowra (AU); Assaph Mehr, St. Leonards (AU); Nivedita Mogale, Beaumont Hills (AU); David Shaw, Croydon Park (AU)

(73) Assignee: Avaya Inc., Basking Ridge, NJ (US)

( * ) Notice: Subject to any disclaimer, the term of this patent is extended or adjusted under 35 U.S.C. 154(b) by 379 days.

(21) Appl. No.: 11/040,352

(22) Filed: Jan. 20, 2005

(65) Prior Publication Data

US 2006/0158310 A1      Jul. 20, 2006

(51) Int. Cl.
*H04Q 5/22* (2006.01)
(52) U.S. Cl. ............. 340/10.1; 340/5.64; 340/5.61; 340/10.4; 340/825.69; 340/825.72
(58) Field of Classification Search ........... 340/10.1, 340/10.4, 825.69, 825.72, 5.61, 5.64; 455/403, 455/41.2, 90.2, 414.1
See application file for complete search history.

(56) References Cited

U.S. PATENT DOCUMENTS

| | | |
|---|---|---|
| 515,426 A | 2/1894 | French et al. |
| 4,074,069 A | 2/1978 | Tokura et al. |
| 4,275,385 A | 6/1981 | White |
| 4,446,454 A | 5/1984 | Pyle |
| 5,206,903 A | 4/1993 | Kohler et al. |
| 5,315,434 A | 5/1994 | Mizuno et al. |
| 5,461,390 A | 10/1995 | Hoshen |
| 5,515,426 A | 5/1996 | Yacenda et al. |
| 5,543,778 A | 8/1996 | Stouffer |
| 5,550,547 A | 8/1996 | Chan et al. |
| 5,555,376 A | 9/1996 | Theimer et al. |
| 5,558,013 A | 9/1996 | Blackstone, Jr. |
| 5,627,375 A | 5/1997 | Hsieh |
| 5,680,450 A | 10/1997 | Dent et al. |
| 5,689,548 A | 11/1997 | Maupin et al. |

(Continued)

FOREIGN PATENT DOCUMENTS

CN      1141567      1/1997

(Continued)

OTHER PUBLICATIONS

U.S. Appl. No. 10/607,414, filed Jun. 25, 2003, Becker et al.

(Continued)

*Primary Examiner*—Vernal U Brown
(74) *Attorney, Agent, or Firm*—Sheridan Ross P.C.

(57) ABSTRACT

A wireless access point in an object location system is provided that includes a tag filtering agent 128 operable to (a) receive tag information from a mobile communication device 104, (b) compare the received tag information with a set of a plurality of tag information to determine whether to report the received tag information to a central registry 116; and (c) when appropriate report the received tag information and physical location information to the central registry 116. The tag information corresponds to tag information contained by a tag 120 on an object and was obtained by a tag reader 256 on the mobile communication device. The physical location information corresponds to a physical location of the mobile communication device 104 at a selected point in time.

27 Claims, 3 Drawing Sheets

U.S. PATENT DOCUMENTS

| | | | |
|---|---|---|---|
| 5,742,666 A | 4/1998 | Alpert | |
| 5,748,083 A | 5/1998 | Rietkerk | |
| 5,793,861 A | 8/1998 | Haigh | |
| 5,805,999 A | 9/1998 | Inoue | |
| 5,828,747 A | 10/1998 | Fisher et al. | |
| 5,884,262 A | 3/1999 | Wise et al. | |
| 5,905,659 A | 5/1999 | Rose | |
| 5,905,793 A | 5/1999 | Flockhart et al. | |
| 5,960,061 A | 9/1999 | Fahie et al. | |
| 5,982,873 A | 11/1999 | Flockhart et al. | |
| 6,046,683 A | 4/2000 | Pidwerbetsky et al. | |
| 6,067,017 A | 5/2000 | Stewart et al. | |
| 6,069,570 A | 5/2000 | Herring | |
| 6,076,121 A | 6/2000 | Levine | |
| 6,100,806 A | 8/2000 | Gaukel | |
| 6,104,288 A | 8/2000 | Hopkins | |
| 6,104,711 A | 8/2000 | Voit | |
| 6,173,053 B1 | 1/2001 | Bogart et al. | |
| 6,192,122 B1 | 2/2001 | Flockhart et al. | |
| 6,236,313 B1 | 5/2001 | Eskildsen et al. | |
| 6,236,365 B1 | 5/2001 | LeBlanc et al. | |
| 6,249,227 B1 | 6/2001 | Brady et al. | |
| 6,265,963 B1 | 7/2001 | Wood, Jr. | |
| 6,275,794 B1 | 8/2001 | Benyassine et al. | |
| 6,282,574 B1 | 8/2001 | Voit | |
| 6,310,549 B1 | 10/2001 | Loftin et al. | |
| 6,359,880 B1 | 3/2002 | Curry et al. | |
| 6,362,778 B2 | 3/2002 | Neher | |
| 6,377,203 B1 | 4/2002 | Doany | |
| 6,400,265 B1 | 6/2002 | Saylor et al. | |
| 6,449,358 B1 | 9/2002 | Anisimov et al. | |
| 6,453,291 B1 | 9/2002 | Ashley | |
| 6,456,964 B2 | 9/2002 | Manjunath et al. | |
| 6,463,607 B2 | 10/2002 | Hartmann | |
| 6,486,780 B1 | 11/2002 | Garber et al. | |
| 6,496,806 B1 * | 12/2002 | Horwitz et al. | 705/28 |
| 6,504,838 B1 | 1/2003 | Kwan | |
| 6,505,780 B1 | 1/2003 | Yassin et al. | |
| 6,559,620 B2 | 5/2003 | Zhou et al. | |
| 6,580,908 B1 | 6/2003 | Kroll et al. | |
| 6,600,443 B2 | 7/2003 | Landt | |
| 6,650,901 B1 | 11/2003 | Schuster et al. | |
| 6,661,340 B1 | 12/2003 | Saylor et al. | |
| 6,678,357 B2 | 1/2004 | Stumer et al. | |
| 6,687,668 B2 | 2/2004 | Kim et al. | |
| 6,694,787 B1 | 2/2004 | Brown | |
| 6,705,522 B2 | 3/2004 | Gershman et al. | |
| 6,707,383 B2 | 3/2004 | Flaherty | |
| 6,757,359 B2 | 6/2004 | Stumer et al. | |
| 6,759,957 B2 | 7/2004 | Murakami et al. | |
| 6,763,231 B2 | 7/2004 | Takatori et al. | |
| 6,778,084 B2 | 8/2004 | Chang et al. | |
| 6,778,096 B1 | 8/2004 | Ward et al. | |
| 6,804,329 B2 | 10/2004 | Geck et al. | |
| 6,825,767 B2 | 11/2004 | Humbard | |
| 6,847,892 B2 | 1/2005 | Zhou et al. | |
| 6,892,052 B2 | 5/2005 | Kotola et al. | |
| 6,898,434 B2 | 5/2005 | Pradhan et al. | |
| 6,901,255 B2 | 5/2005 | Shostak | |
| 6,907,238 B2 | 6/2005 | Leung | |
| 6,965,313 B1 | 11/2005 | Saylor et al. | |
| 6,972,682 B2 | 12/2005 | Lareau et al. | |
| 6,983,124 B1 | 1/2006 | Bayley et al. | |
| 6,990,328 B2 | 1/2006 | Crandall et al. | |
| 6,996,402 B2 | 2/2006 | Logan et al. | |
| 7,005,985 B1 | 2/2006 | Steeves | |
| 7,015,817 B2 | 3/2006 | Copley et al. | |
| 7,027,564 B2 | 4/2006 | James | |
| 7,030,731 B2 | 4/2006 | Lastinger et al. | |
| 7,030,761 B2 | 4/2006 | Bridgelall et al. | |
| 7,036,729 B2 | 5/2006 | Chung | |
| 7,040,532 B1 * | 5/2006 | Taylor et al. | 235/375 |
| 7,042,359 B2 * | 5/2006 | Clucas | 340/572.1 |
| 7,084,740 B2 | 8/2006 | Bridgelall | |
| 7,088,242 B2 * | 8/2006 | Aupperle et al. | 340/539.32 |
| 7,113,090 B1 | 9/2006 | Saylor et al. | |
| 7,123,149 B2 | 10/2006 | Nowak et al. | |
| 7,126,470 B2 | 10/2006 | Clift et al. | |
| 7,135,977 B2 | 11/2006 | Burg et al. | |
| 7,149,503 B2 | 12/2006 | Aarnio et al. | |
| 7,155,238 B2 | 12/2006 | Katz | |
| 7,183,907 B2 | 2/2007 | Simon et al. | |
| 7,202,783 B2 | 4/2007 | Want et al. | |
| 7,209,771 B2 | 4/2007 | Twitchell, Jr. | |
| 7,212,829 B1 | 5/2007 | Lau et al. | |
| 7,228,429 B2 | 6/2007 | Monroe | |
| 7,257,108 B2 | 8/2007 | Cheston et al. | |
| 7,262,690 B2 | 8/2007 | Heaton et al. | |
| 7,274,909 B2 | 9/2007 | Perttila et al. | |
| 7,280,833 B2 | 10/2007 | Suda et al. | |
| 7,330,464 B2 | 2/2008 | Brouwer et al. | |
| 7,333,479 B2 | 2/2008 | Jalkanen et al. | |
| 7,373,109 B2 | 5/2008 | Pohja et al. | |
| 7,378,956 B2 | 5/2008 | Nam et al. | |
| 2002/0005894 A1 | 1/2002 | Foodman et al. | |
| 2002/0103636 A1 | 8/2002 | Tucker et al. | |
| 2002/0165711 A1 | 11/2002 | Boland | |
| 2002/0167405 A1 | 11/2002 | Shanks et al. | |
| 2002/0173328 A1 | 11/2002 | Min | |
| 2003/0104800 A1 | 6/2003 | Zak | |
| 2003/0152212 A1 | 8/2003 | Burok et al. | |
| 2003/0227540 A1 | 12/2003 | Monroe | |
| 2003/0233189 A1 | 12/2003 | Hsiao et al. | |
| 2004/0002305 A1 | 1/2004 | Byman-Kivivuori et al. | |
| 2004/0029558 A1 | 2/2004 | Liu | |
| 2004/0095238 A1 | 5/2004 | Beere | |
| 2004/0134984 A1 | 7/2004 | Powell et al. | |
| 2004/0135674 A1 | 7/2004 | Shanks et al. | |
| 2004/0142678 A1 | 7/2004 | Krasner | |
| 2004/0186768 A1 | 9/2004 | Wakim et al. | |
| 2004/0203352 A1 | 10/2004 | Hall et al. | |
| 2004/0203944 A1 | 10/2004 | Huomo et al. | |
| 2004/0253926 A1 * | 12/2004 | Gross | 455/67.11 |
| 2005/0083911 A1 | 4/2005 | Grabelsky et al. | |
| 2005/0088299 A1 | 4/2005 | Bandy et al. | |
| 2005/0110612 A1 * | 5/2005 | Carrender | 340/10.1 |
| 2005/0128295 A1 | 6/2005 | Addy | |
| 2006/0094405 A1 | 5/2006 | Dupont | |
| 2006/0120517 A1 | 6/2006 | Moon et al. | |
| 2006/0121916 A1 | 6/2006 | Aborn et al. | |
| 2006/0177071 A1 | 8/2006 | Eskildsen | |
| 2006/0181401 A1 | 8/2006 | Martin | |
| 2006/0219473 A1 | 10/2006 | Boland et al. | |

FOREIGN PATENT DOCUMENTS

| | | |
|---|---|---|
| EP | 0 899 673 A2 | 3/1999 |
| EP | 0 998 108 A1 | 5/2000 |
| EP | 1 091 307 A1 | 4/2001 |
| EP | 1 150 236 A2 | 10/2001 |
| EP | 1324255 * | 7/2003 |
| GB | 2298106 | 8/1996 |
| JP | H08-191311 | 7/1996 |
| JP | 2002-250768 | 9/2002 |
| JP | 2004013789 | 1/2004 |
| JP | 2004-242274 | 8/2004 |
| JP | 2004-318283 | 11/2004 |
| WO | 01/95642 | 12/2001 |
| WO | WO 01/94967 | 12/2001 |
| WO | WO 02/44865 | 6/2002 |
| WO | 2004/092999 | 10/2004 |

WO WO 2005001669 1/2005

OTHER PUBLICATIONS

U.S. Appl. No. 10/652,914, filed Aug. 28, 2003, Gentle et al.
U.S. Appl. No. 10/795,119, filed Mar. 5, 2004, Moon et al.
U.S. Appl. No. 10/932,507, filed Sep. 1, 2004, Fegan et al.
U.S. Appl. No. 10/911,090, filed Aug. 3, 2004, Fegan et al.
RFID Journal, *Frequently Asked Questions*, Manufacturing, available at http://www.rfidjournal.com/article/articleview/207, 7 pages.
AIM, RFID.ORG, Searching for RFID Information, available at http://www.aimglobal.org/technologies/rfid, 3 pages.
WYSE, *RFID*, available at http://searchnetworking.techtarget.com/sDefinition/0,,sid7_gci805987,00.html, 2 pages (updated Jan. 16, 2004).
Time Online Edition, *Global Business—The See-It-All Chip*, available at http://www.time.com/time/globalbusiness/article/0,9171,1101030922-485764-3,00.html, 3 pages (Sep. 22, 2003).
Wired News, *Radio ID Tags: Beyond Bar Codes*, available at http://www.wired.com/news/technology/0,1282,52343,00.html, 3 pages (May 20, 2002).
Newsweek, *An Internet of Things—Is RFID the Mark of Satan. . .* , available at http://msnbc.msn.com/id/3068871, 4 pages (Jun. 10, 2004).
RFID, *Tracking Everything, Everywhere*, by Katherine Albrecht, available at http://www.stoprfid.org/rfid_overview.htm, 7 pages.
RFID, *Wikipedia, the free encyclopedia*, available at http://en.wikipedia.org/wiki/RFID, 3 pages (Updated May 31, 2004).
The Denver Post, *Bar Code Meets Its Match*, Section C, (Jun. 3, 2004), p. 1C and 8C.
Cisco Systems, Inc., *Cisco Emergency Responder* Version 1.1 (Oct. 2001), 5 pages.
Avaya: Communication without Boundaries, *Solving the Challenges of E911 Service with Avaya IP Telephony Networks*, White Paper, Nov. 2002, Issue 1.1, 10 pages.
Cisco Data Sheet, *Cisco Emergency Responder* Version 1.1 Jul. 20, 2002, available at http://www.cisco.com/warp/public/cc/pd/unco/cer/prodlit/emerg_ds.htm, 7 pages.
Cisco, *Cisco Emergency Responder*, printed Feb. 11, 2003, available at http://www.cisco.com/warp/public/cc/pd/unco/cer/, 2 pages.
EIA Telecommunications Industry Association, *TIA Telecommunications Systems Bulletin: Telecommunications—IP Telephony Infrastructures—IP Telephony Support for Emergency Calling Service*, TSB-146, Mar. 2003, pp. 1-30.
RedSky Technologies, Inc.; "Welcome to RedSky's E-911 Business Watch" *E-911 Business Watch*, Issue 4 (Oct. 21, 2003), 5 pages.
Applied Generics Technical Report "NERO24 Mobile Location System (GSM Edition)," Version 1.0 (2004), pp. 1-27.
EP Search Report issued Jul. 5, 2006, for Application No. EP 0625 0657.
Active Campus Tutorial by David Casteron dated Oct. 11, 2003, downloaded from http://activecampus-dev.ucsd.edu/ntutorial/main.htm on Apr. 12, 2005.
Project Mayhem by Phillip Dressen, James Gillespie, Benjamin Hoyt and Simone Nicolo, downloaded freom http://www.cs.colorado.edu/upgrad/seniorproject/projects/projectmahhem.html on Apr. 12, 2005.
Mobile in a Minute downloaded from www.mobilein.com/location_based_services.htm on Apr. 12, 2005.
Location Based Services downloaded from http://www.ericsson.com/telecomreport/article.asp?aid=34&tid=tid=201&ma=1&msa=3 on Apr. 12, 2005.
Notice of Preliminary Rejection from the Korean Intellectual Property Office (including translation) for Korean Patent Application No. 2006-0006464, dated Dec. 13, 2006.
First Examination Report for European Patent Application No. 06250657.1, mailed Dec. 15, 2006.
U.S. Appl. No. 10/810,459, filed Mar. 27, 2004, Orbach.
Avaya "Administrator's Guide for Avaya Communication Manager; vols. 1, 2, and 3," 555-533-506, Issue 7 (Nov. 2003), pp. 121, 129, 886, 889, 1169, 1193, 1555.
Comments of Nortel Networks, Before the Federal Communications Commission, May 28, 2004, pp. 1-22 with Appendices 1-4.
Khaled El-Maleh et al., "Comparison of Voice Activity Detection Algorithms for Wireless Personal Communications Systems," McGill University, Department of Electrical Engineering (1997), pp. 1-26.
Mobile in a Minute downloaded from www.mobilein.com/location_based_services.htm; copyright 2001-2004.
Nikos Doukas et al., "Voice Activity Detection Using Source Separation Techniques", Signal Processing Section, Dept. of Electrical Engineering, Imperial College, UK, four (4) pages; undated.
Schulzrinne, "Providing Emergency Call Services for SIP-based Internet Telephony", Available at: http://www.iptel.org/info/players/ietf/location/draft-schulzrinne-sip-91--00.txt, Jul. 2000, pp. 1-14.
European Examination Report for related Application No. 06250657.1 (Dec. 15, 2006).
U.S. Appl. No. 11/369,692, filed Mar. 6, 2006, Sadot et al.
"Perimeter Security Sensor Technologies Handbook," available at http://www.nlectc.org/perimetr/full2.htm, 104 pages; printed Feb. 2, 2005.
Examination Report for European Patent Application No. 06250657.1, mailed Nov. 11, 2007.
Background of the Invention for the above-captioned application (previously provided).
Examiner's Office Letter (including translation) for Japanese Patent Application No. 2006-011814, mailed Jan. 28, 2009.

* cited by examiner

MOBILE DEVICES INCLUDING RFID TAG READERS

CROSS REFERENCE TO RELATED APPLICATION

Cross reference is made to U.S. patent application Ser. Nos. 10/911,090, filed Aug. 3, 2004, entitled "INTEGRATED REAL-TIME AUTOMATED LOCATION POSITIONING ASSET MANAGEMENT SYSTEM" and 10/932,507, filed Sep. 1, 2004, entitled "COMMUNICATION DEVICE LOCATING SYSTEM", each of which is incorporated herein by this reference.

FIELD

The invention relates generally to object tracking and particularly to object tracking using a communications network.

BACKGROUND

Each year, crimes, including theft, acts of terrorism, and other acts of violence, are a major global issue. Crime rates are rising, with drastic consequences for society, its members, and the economy. Automatic identification systems, such as asset management and security systems, have been long employed for combating property crimes, particularly shop lifting. Automatic identification systems refer to a host of technologies used to assist machines in identifying objects, such as assets and people. There are a number of technologies falling under the automatic identification umbrella, including bar codes, smart cards, voice recognition technologies, biometric technologies (such as retina scans), optical character recognition technologies, Radio Frequency IDentification or RFID systems, magneto-acoustic systems, and other technologies.

RFID, in particular, is gaining wide acceptance as a highly effective and inexpensive automatic identification methodology. RFID is a generic term for technologies that use radio waves to identify automatically objects. Passive and active RFID transponders or tags contain coiled antennas to enable them to receive and respond to radio-frequency queries from an RFID reader or transceiver (which also includes an antenna). The transceiver converts the radio waves returned from the RFID tag into a form that can be passed onto computers. Typically, a serial number that identifies a product uniquely, and sometimes other information, is stored on the RFID tag (which can store up to 2 KB of data). Passive RFID tags do not have a power supply. A minute electrical current induced in an antenna by the incoming radio-frequency scan provides enough power for the tag to send a response. Active RFID tags have an on-board power source and may have longer ranges and larger memories than passive tags and the ability to store additional information sent by the transceiver. Semi-passive RFID tags use an on-board power source to run the tag's circuitry but communicate by drawing power from the transceiver. Chips in RFID tags can be read-write or read-only.

Automatic identification systems, however, have not been a complete solution to preventing and/or solving crimes. For example, they typically require either movement of objects or people past scanners (e.g., palettes leaving a warehouse or airline passengers moving past a magnetic detector) or employees around a facility to verify manually that the data matches the records (e.g., stock takes). The locations of the scanners are fixed. Only if an object or person happens to pass through the scanner can they be located. Missing or stolen objects that are being used in a public setting often escape detection. Moreover, Local Area Networks or LAN's for automatic identification systems are not widely used due to the high cost and installation expenses of the cabling necessary to support the LAN.

SUMMARY

These and other needs are addressed by the various embodiments and configurations of the present invention. The present invention is generally directed to the use of automatic identification systems, particularly RFID systems, in mobile networked devices to detect and locate selected tags and the object/person associated therewith. As used herein, a "tag" refers to any active or passive device comprising readable information, such as a barcode, smart card, memory card, microprocessor card, and transponder.

In one embodiment of the present invention, an automatic identification method for locating an object associated with a tag is provided. The method includes the steps:

(a) in a mobile communication device comprising a tag reader, the tag reader wirelessly accessing tag information from the tag on the object and (b) the mobile communication device reporting the accessed tag information to a wireless access point. Examples of the mobile communication device include a cellular phone, a laptop, and a Personal Digital Assistant or PDA. The tag information can be a single bit (ON/OFF), such as contained in a one-bit transponder, or, more typically, a plurality of bits, which commonly includes a unique, numerical, alphabetical, or alphanumerical code, such as contained in an n-bit transponder. The tracked object can be animate or inanimate, e.g., a person (such as a parolee, a VIP, person under surveillance, a suspect, and the like), an animal (e.g., livestock, pets, and the like), automobiles, bicycles, motorcycles, consumer goods, weapons, explosives, banned substances, drugs, and the like.

In one configuration, the tag information is provided by the wireless access point to a Central RFID Registry System or CRRS. The CRRS is typically managed and funded by a local, state, provincial, or federal governmental entity or a private authority. Once a tag is located and scanned, the tag reader can query or otherwise report the tag information the wireless access point and/or CRRS as a standalone message or as part of a standard or normal telecommunications control or bearer message. When the tag is of interest to the CRRS, appropriate personnel can be dispatched to the physical location of the mobile communication device (during tag scanning). To avoid inappropriate privacy intrusions, the physical location of the device can be provided by wireless access point only when the tag is reported as corresponding to a missing or stolen object and/or the mobile communication device user can be prohibited from accessing the tag information being accessed by their device. Tracking tags can assist law enforcement and security personnel in locating lost, missing, or stolen objects, tracking banned or controlled substances or weapons, and tracking persons such as parolees and crime suspects.

The tag reader is connected to or integrated with the mobile communication device and can access the CRRS via the wired and/or wireless network in communication with the device. While the mobile communication is switched on, the tag reader attempts to find and scan tags located within the reader's range. Mobile users can be motivated by communication service discounts and/or payment(s) to participate in the system, thereby increasing the number of mobile readers engaged with mobile communication devices and therefore the efficiency of the system. The random movement of the owners of the mobile devices can provide an almost effortless large area scanning process. In this manner, a wide area, regional area, metropolitan area, or local area object tracking network can be provided and crime rates can be reduced using an automated neighborhood watch style solution.

In these configurations, the tag reader and other logic can be implemented as software stored on a computer readable medium or a logic circuit.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
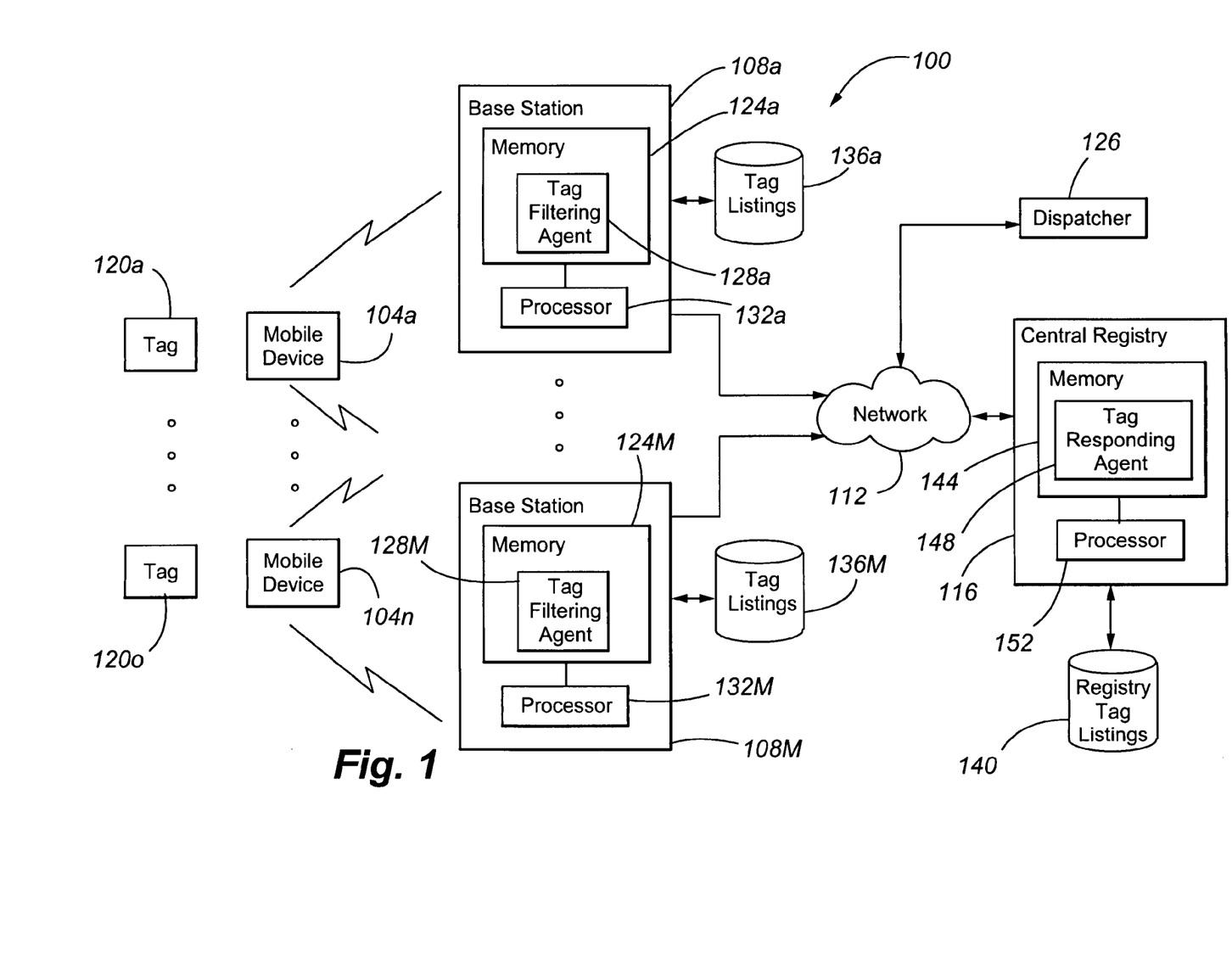
FIG. 1 is a block diagram of an automatic identification network according to an embodiment of the present invention.

FIG. 1 depicts an automatic identification network according to an embodiment of the present invention. The system 100 comprises a plurality of mobile communication devices 104a-n in communication with a plurality of base stations 108a-m, which are turn in communication via network 112 with a central registry 116. The system 100 locates animate or inanimate objects corresponding with the tags 120a-o by means of tag readers located in the mobile communication devices 104a-n. The base stations 108a-m report the detected tag information and the reporting mobile communication device's physical location information to the central registry 116 via network 112. The registry 116 can contact dispatcher 126 to dispatch appropriate personnel, such as police, security personnel, and the like, when selected tag data, such as a unique tag identifier corresponding to a selected object, is identified.

The mobile communication devices 104a-n can be one or more types of mobile communication devices comprising tag readers. Examples include cellular phones, Personal Digital Assistants or PDA's, laptops, radios, walkie-talkies, pagers, tag reader-equipped vehicles, such as police cars, and the like.

Figure 2:
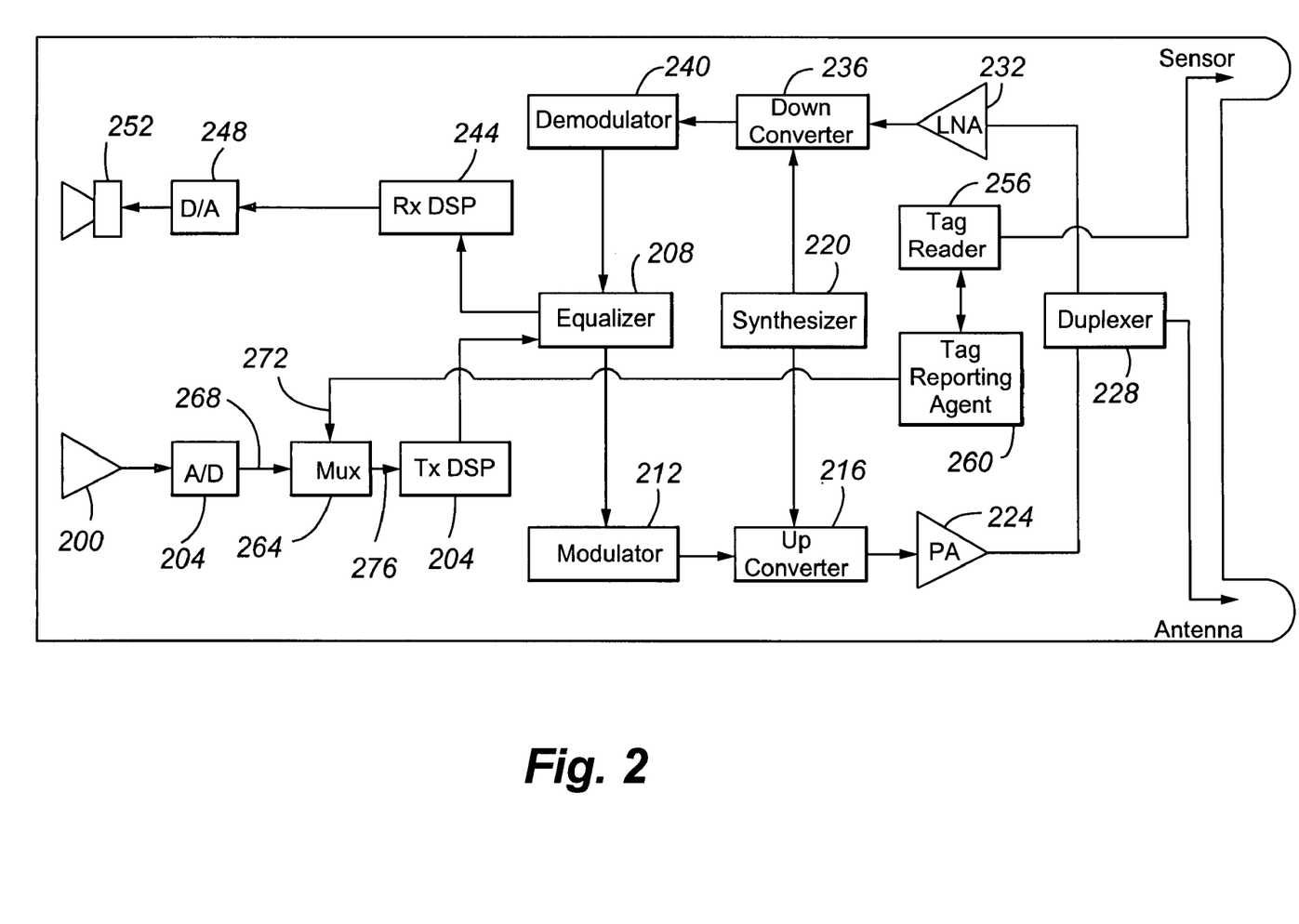
FIG. 2 is a block diagram of a mobile device according to an embodiment of the present invention.

An exemplary mobile communication device 104 is shown in FIG. 2. The device 104 is a communications device, such as a cellular telephone, that includes a microphone 200, Analog-to-Digital Converter 204 that converts the analog voice stream received from the microphone 200 into a digital voice stream, a transmitter (Tx) digital signal processor (DSP) 204 that performs speech encoding, channel encoding, and interleaving, an equalizer 208 that compensates for any frequency-dependent impairments occurring during transmission, a modulator 212 that modulates (typically in frequency or phase) the received signal, an upconverter 216 that changes the frequency of the signal, a synthesizer 220 that generates various carrier frequencies, a power amplifier 224, a duplexer 228 that acts as a double filter (one for the transmit band and one for the receive band), an antenna that sends and receives signals, a low noise amplifier 232, a down converter 236 that lowers the carrier frequency, a demodulator 240 that strips away the radio frequency leaving only a digital bit stream, a receiver (Rx) DSP 244 that performs speech and/or channel decryption and component separation of the digital bit stream, a digital-to-analog (D/A) converter 248 that converts the digital voice stream to an analog voice stream, a speaker 252 that provides the analog voice stream to the user, a tag reader 256 and sensor that collectively receive data from tags 120, a multiplexer 264 that combines inputs 268 and 272 into a single digital output stream 276, and a tag reporting agent 260 that, upon the occurrence of a tag reporting event, provides sensed tag data or information and corresponding mobile communication device physical location information to the multiplexer 264 as the input 272. As will be appreciated, the mobile communication device physical location information can be generated by any conventional technique such as radiophysical location techniques (e.g., triangulation, angle of arrival, signal strength, and time-based techniques) and GPS signals received from a GPS receiver on board the mobile communication device.

The set of tag and physical location information can be provided to the base station in a variety of different ways. The information may be transmitted as part of normal or routine signals exchanged between the mobile communication device and base station. For example, the information may be conveyed on a control channel in a system id code signal, a registration request, a call setup signal, a hand off signal, and/or another type of signal exchanged between the mobile communication device and the base station over the control channel and/or on the bearer channel during a call or when the mobile communication device is in the idle state (i.e., when the device is not receiving or making calls). For example, in CDMA 2000 when the mobile communication device is in the idle state, the base station sends the configuration system and overhead information on the PAGING channel and the communication device responds on the ACCESS channel. These messages are generally called paging and access channel messages, respectively. Typically, the message includes at least the current location of the mobile communication device, the collected tag information, and a time stamp. As will be appreciated, the messages will vary depending on the standard(s) in use.

Returning to FIG. 1, the base stations 108a-m can be any wireless access point, such as a cell site in a cellular, Personnel Communications Service or PCS, or Specialized Mobile Radio or SMR system, modified as set forth below. It typically includes the necessary infrastructure to enable wireless communications including a tower (not shown), antennas (not shown), cables (not shown), RF transceivers (not shown), and power supplies (not shown). The base station may communicate with the mobile communication devices using any suitable protocol, such as Advanced Mobile Telephone Service, Code Division Multiple Access, Digital Advanced Mobile Telephone Service, Digital Communication Service, Group Special Mobile, Japan Total Access Communications System, North American Digital Cellular, Nordic Mobile Telephone, Personal Communications Services, Personal Digital Cellular, Specialized Mobile Radio, Time Division Multiple Access, 1S-95, WCDMA, and Total Access Communications System.

An exemplary base station configuration is shown in FIG. 1. The base station includes a processor 128 and, in memory 124, a tag filtering agent 128 that (a) determines when, and with what frequency, tag information is provided to the central registry 116 via network 112, (b) for tag information of interest, obtains from the base station physical location logic the physical location of the mobile communication device reporting selected tag information, and (c) reports the tag information and corresponding physical location information to the registry, if appropriate. As will be appreciated, because of the limited range of the tag reader in the mobile communication device 104 the physical location of the mobile communication device 104 provides a close approximation of the physical location of the tagged object.

Different tag reporting events can be used to trigger reporting by the tag reporting agent (to the base station) and/or by the tag filtering agent (to the central registry). For example, tag information can be reported at specified time intervals, upon receipt of tag information corresponding to one or a selected number of tags, upon receipt of specific tag information (e.g., tag information identified as corresponding to a lost or stolen animate or inanimate objects), upon receipt of tag information regarding a specific type of object (e.g., explosives, weapons, etc.), and when it is determined that the physical location of the mobile communication device and/or tracked object (based on tag information reported by a number of different mobile communication devices) has changed by a selected distance, or a combination thereof. For example, for relatively stationary objects, such as large immobile objects, the frequency of reporting the physical location of the corresponding tag information may be less frequent than for small mobile objects. When tag information is received by a base station from several different mobile communication devices, the filtering agent can be configured to send only the most recently reported tag information and its corresponding physical location information rather than all of tag information and all of its reported physical locations.

The tag listings in the databases 136a-m can be listing(s) of tag data to report and/or not to report. An example of the former type of listing is where the listed tag data corresponds to missing or stolen objects or otherwise is of interest to law enforcement or security personnel. An example of the latter type of listing is where the listed tag data does not correspond to missing or stolen objects or otherwise is not of interest to law enforcement or security personnel and/or where the tag information has previously been reported by mobile communication devices within the base station's range.

The network 112 can be one or more wireless or wireline and circuit- or packet-switched networks, depending on the application. Typically, the network 112 comprises the Public Switched Telephone Network and/or the Internet.

Although the mobile communication device 104 is shown as being in wireless communication with the base stations, it is to be understood that the intermediate network connectivity can be any of a number of other configurations. For example, the mobile communication device can be a laptop or PDA wireline connected to an Ethernet port and/or including a location device such as a GPS receiver, which is in turn connected to the Internet and/or a web service (available over the Internet). The mobile communication device can be a laptop or PDA wirelessly in communication (such as via the Bluetooth™, 802.11, HiperLAN, and Digital Enhanced Cordless Telephone standards) with a wireless access point.

The central registry 116 is a private or governmental service that acts as the data repository and database updating agent for tag data. When a tag becomes of interest or is no longer of interest, the tag information is maintained in the registry tag listings database and provided to the various base stations as a request to update their respective tag listing databases. The registry tag listing database 140 typically comprises a listing of tag information that is of interest to the registry operator, such as the tag information associated with lost, missing, or stolen objects, controlled substances (such as explosives, weapons, drugs, and banned substances), and the like. In the memory 144 of the central registry 116, a tag responding agent 148 determines whether tag information received from the base stations is on the list and, if so, forwards the tag and associated physical location information to the dispatcher 126 to dispatch appropriate law enforcement and/or security personnel. A central registry 116 is typically assigned a specific geographic area, such as a part of a city, county, state, province, or country.

Mobile communication device users can be offered incentives to participate in the physical location system. For example, mobile phone users who agree to have tag readers installed in their phones can receive discounts on cell phone rates and/or the purchase price of the cell phone. The discount can be funded wholly or partly by the sponsoring governmental entity.

The operation of the system will now be described with reference to FIGS. 3-5.

Figures 3, 4:
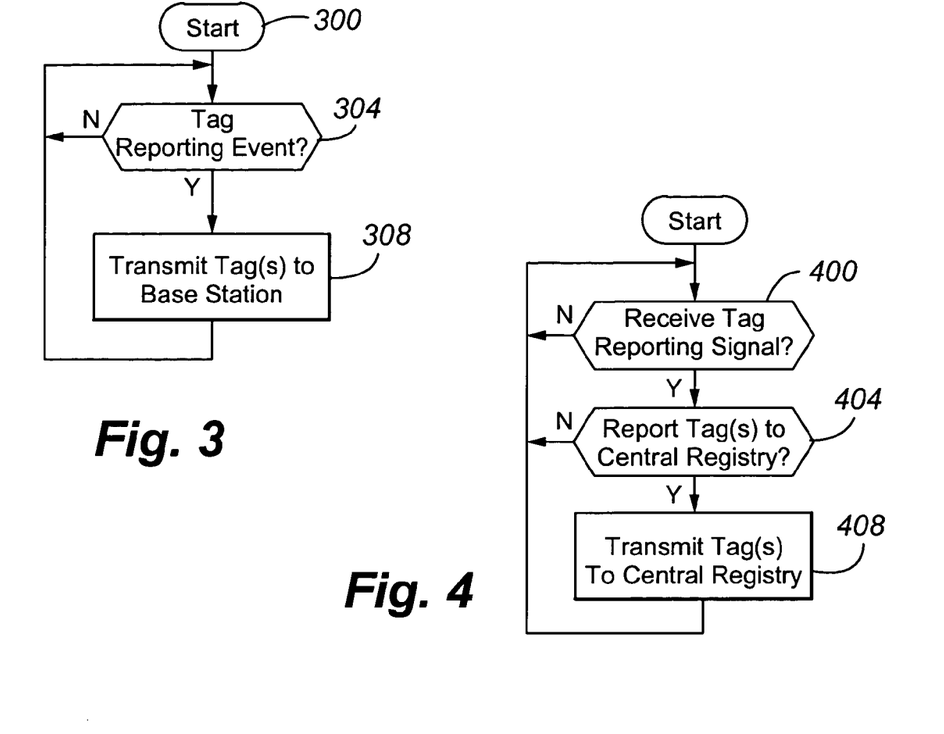
FIG. 3 is a flowchart depicting the operation of a tag reporting agent in a mobile device according to an embodiment of the present invention.
FIG. 4 is a flowchart depicting the operation of a tag filtering agent in a base station according to an embodiment of the present invention.

Referring to FIG. 3, the operation of the tag reporting agent 260 in the mobile communication device 104 will be discussed.

In step 300 the tag reader 256 has sensed a tag 120, accessed tag information from the sensed tag, and reported the tag information to the tag reporting agent 260. In response, the tag reporting agent 260 obtains the current physical location of the host mobile communication device 104.

In decision diamond 304, the tag reporting agent 260 determines whether a tag reporting event has occurred. Exemplary tag reporting events have been discussed previously. If not, the agent 260 returns to decision diamond 304 until a tag reporting event has occurred. If so, the agent 260 proceeds to step 308 and transmits the tag information and associated mobile communication device physical location information and time stamp (indicating when the tag information was accessed by the tag reader in the mobile communication device) to the base station 108.

Referring to FIG. 4, the operation of the tag filtering agent 128 in the base station 108 will be now discussed.

In decision diamond 400, the filtering agent 128 determines whether a tag reporting signal has been received from the tag reporting agent in a mobile communication device within range of (or currently being serviced by) the base station. If not, the agent 128 repeats decision diamond 400 until such a signal is received. If so, the agent 128 proceeds to decision diamond 404.

In decision diamond 404, the filtering agent 128 determines whether or not to report to the central registry the tag and physical location information and associated time stamp in the received tag reporting signal. The trigger for reporting the information can be the occurrence of a tag reporting event. For example, the tag information can be included in a report or not report list in the associated database 136. When the information is not to be reported, the agent 128 returns to decision diamond 400. When the information is to be reported, the tag and physical location information and associated time stamp is forwarded to the central registry in a further tag reporting signal. The agent 128 then returns to decision diamond 400.

Figure 5:
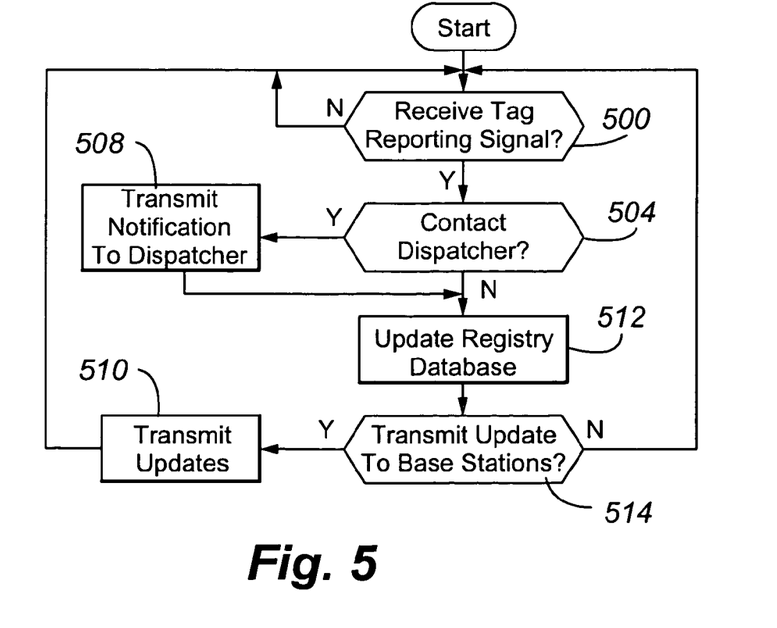
FIG. 5 is a flowchart depicting the operation of a tag responding agent in a central registry according to an embodiment of the present invention.

Referring to FIG. 5, the operation of the tag responding agent 148 in the central registry 116 will be now discussed.

In decision diamond 500, the responding agent 148 determines whether a tag reporting signal has been received from the tag filtering agent in a base station 108 serviced by the central registry 116. If not, the agent 148 repeats decision diamond 500 until such a signal is received. If so, the agent 148 proceeds to decision diamond 504.

In decision diamond 504, the agent 148 determines whether the received tag and physical location information and associated time stamp should be reported to the dispatcher 124. This is typically effected by mapping the received tag information against one or more tag information listings in the database 140. The database may include a plurality of listings of tags of interest to law enforcement/security personnel, each listing having a corresponding level of priority or importance. For example, objects having lower values may be in a lower priority list while objects having higher values are in a higher priority list. In such an implementation, the tag and associated physical location information and timestamp and corresponding priority level would be transmitted to the dispatcher. When the received tag and physical location information and timestamp are to be reported, the agent 148, in step 508, forwards the information to the dispatcher.

When the received tag and physical location information is not to be reported or after step 508, the agent 148 updates the registry database 140. The updates may take many forms, such as incrementing a reporting counter related to a number of reporting instances of the tag information, adding a further entry to the tag information's record including a time stamp for the current reporting, identity of the reporting base station and/or mobile communication device, and the associated physical location information. The update may also cause the tag information to removed from a list or moved to another list. This can occur when the dispatcher responds with a message in response to the receipt of the tag reporting signal.

In decision diamond 516, the agent 148 determines whether or not to forward an update request to the base stations 108. If so, the update is transmitted in step 520. If not or after step 520, the agent 148 returns to decision diamond 500 to await the receipt of the next tag reporting signal.

A number of variations and modifications of the invention can be used. It would be possible to provide for some features of the invention without providing others.

For example in one alternative embodiment, the tag reporting agent 260, tag filtering agent 128, and/or tag responding agent 148 are implemented in software, hardware (e.g., a logic circuit), or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for locating an object, comprising:
   (a) in a mobile communication device comprising a tag reader, the tag reader wirelessly accessing tag information from a tag on an object, the object being separate from and in spatial proximity to the communication device, and
   (b) the mobile communication device reporting the accessed tag information to a wireless access point during a routine communication over a control channel between the cellular phone and the wireless access point, wherein the routine communication is at least one of a system id code signal, a registration request, a call setup signal, and a hand off signal, and wherein a law enforcement agency is notified when the tag information indicates a potential law violation involving the object.

2. The method of claim 1, wherein the mobile communication device is a cellular phone and the wireless access point is a base station and further comprising:
   (c) the wireless access point receiving the tag information;
   (d) the wireless access point comparing the tag information with a listing of tag information corresponding to a plurality of tags to determine whether to report the received tag information to a central registry; and
   (e) when the received tag information is to be reported, transmitting to the central registry the tag information, physical location information, and a time stamp associated with the reporting mobile communication device.

3. The method of claim 2, further comprising:
   (f) the central registry receiving the tag and physical location information;
   (g) the central registry comparing the tag information with a listing of tag information corresponding to a plurality of tags to determine whether to report the received tag information to a dispatcher; and
   (h) when the received tag information is to be reported, transmitting to a dispatcher the tag and physical location information and associated time stamp.

4. The method of claim 1, wherein, in the reporting step, the mobile communication device further provides to the wireless access point a physical location of the communication device and wherein the physical location is determined by a Global Positioning System module in communication with the mobile communication device.

5. The method of claim 2, wherein in the transmitting step (e), the wireless access point further provides to the central registry a physical location of the communication device and wherein the physical location is determined by the wireless access point in communication with the mobile communication device.

6. A computer readable medium comprising processor-executable instructions operable to perform the steps of claim 1.

7. A wireless access point in an object location system, comprising:
a tag filtering agent operable to receive tag information through a routine communication from a mobile communication device, wherein the tag information corresponds to tag information contained by a tag on an object, separate from and in spatial proximity to the communication device, and was obtained by a tag reader on the mobile communication device, wherein the physical location information corresponds to a physical location of the mobile communication device at a selected point in time, and wherein the routine communication is at least one of a system id code signal, a registration request, a call setup signal, a hand off signal, another type of signal exchanged over a call control channel and/or a bearer channel during a voice call, and another type of signal exchanged over a call control channel when the cellular phone is in an idle state.

8. The wireless access point of claim 7, wherein the physical location information is received from a Global Positioning System module on the mobile communication device and approximates a physical location of the mobile communication device when the tag information was obtained by the tag reader.

9. The wireless access point of claim 7, wherein the physical location information is determined by the wireless access point and approximates a physical location of the mobile communication device when the tag information was obtained by the tag reader.

10. The wireless access point of claim 7, wherein the mobile communication device is a cellular phone and the wireless access point is a base station, and wherein the tag filtering agent reports a time stamp to the central registry, the time stamp being associated with the reporting mobile communication device and approximating a time when the tag information was obtained by the tag reader.

11. The wireless access point of claim 7, wherein the central registry comprises a tag responding agent operable to (a) receive the tag and physical location information; (b) compare the tag information with a listing of tag information corresponding to a plurality of tags to determine whether to report the received tag information to a dispatcher; and (c) when the received tag information is to be reported, transmit to the dispatcher the tag and physical location information.

12. The wireless access point of claim 10, wherein the tag information is included in a routine communication between the cellular phone and base station.

13. The wireless access point of claim 10, wherein the tag information is transmitted on one or both of the control and bearer channels between the mobile communication device and wireless access point.

14. The wireless access point of claim 7, wherein the mobile communication device is a laptop and the wireless access point is a web service.

15. A system for locating an object, comprising:
a base station operable to communicate with a plurality of tag reporting agents operable to report respective accessed tag information to the base station, wherein the accessed tag information is received by a plurality of tag readers from tags located on a plurality of objects, wherein the tag readers and tag reporting agents are located in a plurality of mobile communication devices, wherein each tag reader is operable to read a plurality of tags, wherein the tag information is included in routine control signals between the communication devices and the base station, and wherein the routine communication is at least one of a system ID code signal, a registration request, a call setup, and a handoff signal.

16. The system of claim 15, wherein the mobile communication device is a cellular phone and wherein the base station comprises a tag filter for (a) comparing the tag information with a listing of tag information corresponding to a plurality of tags to determine whether to report the received tag information to a central registry; and (b) when the received tag information is to be reported, transmitting to a central registry the tag information, physical location information, and a time stamp associated with the reporting mobile communication device.

17. The system of claim 15, further comprising:
a central registry comprising a tag responding agent operable to (a) receive the tag and physical location information; (b) compare the tag information with a listing of tag information corresponding to a plurality of tags to determine whether to report the received tag information to a dispatcher; and (c) when the received tag information is to be reported, transmit to a dispatcher the tag and physical location information and associated time stamp.

18. The system of claim 17, wherein, in the reporting function, the tag reporting agent further provides to the base station a physical location of the communication device and wherein the physical location is determined by a Global Positioning System module in communication with the tag reporting agent.

19. The system of claim 15, wherein the tag information is transmitted on one or both of the control and bearer channels between the plurality of mobile communication devices and base station.

20. The system of claim 15, wherein, in the transmitting operation, the base station further provides to the central registry a physical location of the communication device and wherein the physical location is determined by the base station in communication with the mobile communication device.

21. The system of claim 15, wherein each communication device is a cellular phone, wherein each cellular phone comprises a tag reader and tag reporting agent, wherein the plurality of cellular phones are associated with a plurality of different cellular phone users and wherein, in exchange for each user consenting to the tag reporting agent in the user's communication device providing respective tag information to a base station, the user receives a discount on cellular phone rates and/or a purchase price of the user's cellular phone.

22. The system of claim 17, wherein the dispatcher is associated with a law enforcement authority.

23. A method for locating an object, comprising:
(a) wirelessly accessing tag information from a plurality of tags on one or more objects with a mobile communication device comprising a tag reader, the one or more objects being separate from and in spatial proximity to the communication device, and
(b) reporting the accessed tag information to a wireless access point as part of a routine communication over a control channel between the mobile communication device and the wireless access point, and wherein the routine communication is at least one of a system id code signal, a registration request, a call setup signal, and a hand off signal.

24. The method of claim 23, further comprising:

(c) receiving the tag and physical location information as a part of the routine communication; (d) comparing the tag information with a listing of tag information corresponding to a plurality of tags to determine whether to report the received tag information to a dispatcher; and (e) when the received tag information is to be reported, transmitting to the dispatcher the tag and physical location information.

25. The method of claim 23, further comprising:

(c) comparing the tag information with a listing of tag information corresponding to a plurality of tags to determine whether to report the received tag information to a central registry; and (d) when the received tag information is to be reported, transmitting to a central registry the tag information, physical location information, and a time stamp associated with the reporting mobile communication device.

26. The method of claim 23, wherein the mobile communication device is a cellular phone.

27. The method of claim 23, wherein the mobile communication device is a laptop and the wireless access point is a web service.

* * * * *

UNITED STATES PATENT AND TRADEMARK OFFICE
CERTIFICATE OF CORRECTION

PATENT NO. : 7,589,616 B2 Page 1 of 1
APPLICATION NO. : 11/040352
DATED : September 15, 2009
INVENTOR(S) : Klatsmanyi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,589,616 B2 | Page 1 of 1 |
| APPLICATION NO. | : 11/040352 | |
| DATED | : September 15, 2009 | |
| INVENTOR(S) | : Klatsmanyi et al. | |

It is certified that error appears in the above-identified patent and that said Letters Patent is hereby corrected as shown below:

Claim 1, Column 8, line 32, "cellular phone" should be changed to --mobile communication device--.

Claim 7, Column 9, line 25, "cellular phone" should be changed to --mobile communication device--.

Signed and Sealed this
Twenty-first Day of August, 2012

David J. Kappos
*Director of the United States Patent and Trademark Office*